United States Patent
Hitomi et al.

(10) Patent No.: US 10,857,515 B2
(45) Date of Patent: Dec. 8, 2020

(54) PROCESS FOR PRODUCING ADSORBENT INCLUDING ACTIVATED CARBON

(71) Applicant: KURARAY CO., LTD., Kurashiki (JP)

(72) Inventors: Mitsunori Hitomi, Bizen (JP); Takayuki Yamada, Bizen (JP)

(73) Assignee: KURARAY CO., LTD., Kurashiki (JP)

(*) Notice: Subject to any disclaimer, the term of this patent is extended or adjusted under 35 U.S.C. 154(b) by 0 days.

(21) Appl. No.: 15/510,856

(22) PCT Filed: Sep. 2, 2015

(86) PCT No.: PCT/JP2015/074910
§ 371 (c)(1),
(2) Date: Mar. 13, 2017

(87) PCT Pub. No.: WO2016/043049
PCT Pub. Date: Mar. 24, 2016

(65) Prior Publication Data
US 2017/0274351 A1    Sep. 28, 2017

(30) Foreign Application Priority Data
Sep. 16, 2014  (JP) ................................ 2014-187861

(51) Int. Cl.
| | | |
|---|---|---|
| C01B 31/14 | (2006.01) | |
| B01J 20/20 | (2006.01) | |
| B01D 53/02 | (2006.01) | |
| B01D 53/04 | (2006.01) | |
| B01J 20/30 | (2006.01) | |
| B01J 20/28 | (2006.01) | |
| C01B 32/324 | (2017.01) | |
| C01B 32/33 | (2017.01) | |
| C01B 32/318 | (2017.01) | |
| C01B 32/384 | (2017.01) | |
| B29C 43/14 | (2006.01) | |
| B29C 43/36 | (2006.01) | |

(52) U.S. Cl.
CPC .............. B01J 20/20 (2013.01); B01D 53/02 (2013.01); B01D 53/04 (2013.01); B01J 20/28042 (2013.01); B01J 20/3007 (2013.01); B01J 20/3028 (2013.01); B01J 20/3042 (2013.01); B29C 43/14 (2013.01); B29C 43/36 (2013.01); C01B 32/318 (2017.08); C01B 32/324 (2017.08); C01B 32/33 (2017.08); C01B 32/384 (2017.08); B01D 2253/102 (2013.01); B01D 2253/304 (2013.01); B01D 2257/702 (2013.01); B01D 2257/90 (2013.01); B01D 2259/4516 (2013.01); B01D 2259/4541 (2013.01)

(58) Field of Classification Search
CPC .................................................... C01B 32/384
See application file for complete search history.

(56) References Cited

U.S. PATENT DOCUMENTS

| | | | | |
|---|---|---|---|---|
| 3,920,783 | A | * | 11/1975 | Hara .......................... B01J 2/20 225/103 |
| 6,391,429 | B1 | | 5/2002 | Senkus et al. |
| 6,696,384 | B2 | * | 2/2004 | McCrae .................... B01J 20/20 423/447.1 |
| 6,790,390 | B2 | * | 9/2004 | Py ............................. B01J 20/20 264/29.1 |
| 7,390,593 | B2 | | 6/2008 | Yamamoto et al. |
| 7,976,808 | B2 | * | 7/2011 | Sakurai ................ B01D 53/685 423/240 S |
| 8,501,663 | B2 | | 8/2013 | Gonzalez et al. |
| 10,362,673 | B2 | | 7/2019 | Zhamu et al. |
| 2008/0107589 | A1 | | 5/2008 | von Blucher et al. |

FOREIGN PATENT DOCUMENTS

| | | |
|---|---|---|
| CN | 1463202 A | 12/2003 |
| CN | 1541941 A | 11/2004 |
| CN | 1634761 A | 7/2005 |
| CN | 1272241 C | 8/2006 |
| CN | 101530920 A | 9/2009 |
| JP | 7-267619 A | 10/1995 |
| JP | 2001-322808 A | 11/2001 |
| JP | 2002-35593 A | 2/2002 |
| JP | 2002-253649 A | 9/2002 |
| JP | 2003-38953 A | 2/2003 |
| JP | 2005-798 A | 1/2005 |
| JP | 2005-314149 A | 11/2005 |
| JP | 2007-331986 A | 12/2007 |
| JP | 2008-93661 A | 4/2008 |
| JP | 2009-184849 A | 8/2009 |
| WO | WO 02/083559 A1 | 10/2002 |

OTHER PUBLICATIONS

International Preliminary Report on Patentability and Written Opinion dated Mar. 30, 2017 in PCT/JP2015/074910 (submitting English translation only).
International Search Report dated Dec. 8, 2015, in PCT/JP2015/074910 filed Sep. 2, 2015.
Office Action as received in the corresponding Japanese Patent Application No. 2016-548826 dated Feb. 15, 2019 w/English Translation.
Combined Chinese Office Action and Search Report dated Mar. 13, 2019 in Patent Application No. 201580049360.3 (with unedited computer generated English translation of the Office Action and English Translation of Category of Cited Documents), 18 pages.

(Continued)

Primary Examiner — Stuart L Hendrickson
(74) Attorney, Agent, or Firm — Oblon, McClelland, Maier & Neustadt, L.L.P.

(57) ABSTRACT

A process for producing an adsorbent comprising activated carbon, wherein the process comprises a molding step of molding an adsorbent through a plurality of stages, and wherein the molding step comprises molding in a final stage performed by tableting.

12 Claims, No Drawings

(56) References Cited

OTHER PUBLICATIONS

U.S. Office Action as received in the corresponding U.S. Appl. No. 16/222,713, dated Jul. 14, 2020, 14 pages.

Office Action as received in the corresponding Chinese Patent Application No. 201580049360.3 dated Apr. 3, 2020 w/English Translation.

Application Technology of Activated Carbon—Its Maintenance, Management and Problems, Hideki Tatsumoto, et al,, p. 249, Southeast University Press, published on Jul. 31, 2002, with its partial English translation.

* cited by examiner

PROCESS FOR PRODUCING ADSORBENT INCLUDING ACTIVATED CARBON

TECHNICAL FIELD

The present invention relates to a process for producing an adsorbent comprising activated carbon and, more particularly, to a process for producing an adsorbent comprising activated carbon and having a high adsorption performance and a high size uniformity at the same time.

BACKGROUND ART

Activated carbon has a high ability to adsorb various harmful substances and malodorous substances, and has been conventionally used as an adsorbent in many fields regardless of whether home use or industrial use (Patent Documents 1 and 2). In recent years, the adsorbent comprising activated carbon is used in, for example, deodorants, air cleaners, and water purifiers, and are increasingly expanded in application.

PRIOR ART DOCUMENT

Patent Document

Patent Document 1: JP 2005-314149 A
Patent Document 2: JP 2002-253649 A

SUMMARY OF THE INVENTION

Problem to be Solved by the Invention

However, although such an adsorbent comprising activated carbon exhibits high adsorption performance, the size of the adsorbent is often uneven. Therefore, if such an adsorbent with low size uniformity is used in a gas mask and the like, ventilation resistance becomes high and causes a problem of inability to acquire a sufficient ventilation performance.

Therefore, a problem to be solved by the present invention is to provide a process for producing an adsorbent comprising activated carbon, wherein the adsorbent has a high adsorption performance and a high size uniformity at the same time.

Means for Solving Problem

The inventors found that the problem can be solved by a process for producing an adsorbent comprising activated carbon comprising a molding step of molding an adsorbent through a plurality of stages, the molding step including molding in a final stage performed by tableting, thereby completing the present invention.

Therefore, the present invention includes the following preferred embodiments.

[1] A process for producing an adsorbent comprising activated carbon, wherein the process comprises a molding step of molding an adsorbent through a plurality of stages, and wherein the molding step comprises molding in a final stage performed by tableting.

[2] The process for producing according to the above [1], wherein the molding step is performed as wet molding.

[3] The process for producing according to the above [1] or [2], wherein the adsorbent has a standard deviation of particle length of 0.03 to 0.2, and wherein the particle length is a length of the adsorbent in a depth direction of a mortar in the tableting.

[4] The process for producing according to any one of the above [1] to [3], wherein the adsorbent has a standard deviation of 0.02 to 0.1 for each of a minor axis and a major axis, and wherein the minor axis and major axis are the shortest length of the adsorbent and the longest length of the adsorbent, respectively, orthogonal to the depth direction of the mortar in the tableting.

[5] The process for producing according to any one of the above [1] to [4], wherein moldings other than the molding in the final stage are one or more moldings selected from the group consisting of tableting, hydraulic extrusion molding, pellet mill molding, tumbling granulation molding, and molding by a granulator.

[6] The process for producing according to any one of the above [1] to [5], wherein the activated carbon is produced from one or more raw materials selected from the group consisting of coconut shells, coal, wood, and synthetic resin.

[7] The process for producing according to any one of the above [1] to [6], wherein the adsorbent comprises, as a raw material thereof, one or more binders selected from the group consisting of carboxymethylcellulose, methyl cellulose, polyvinyl alcohol, clay mineral, bentonite, modified acrylic acid ester copolymer, and phenolic resin.

[8] The process for producing according to any one of the above [1] to [7], wherein the adsorbent is an adsorbent used for a gas mask, a solvent recovery apparatus, a deodorant, or an automobile fuel transpiration prevention apparatus.

[9] An adsorbent having at least one shape selected from the group consisting of a spherical shape, a cubic shape, a rectangular parallelepiped shape, a cylindrical shape, a cone shape, a truncated cone shape, a polyhedral shape, a polygonal pyramid shape, a truncated pyramid shape, a donut shape, a tubular shape, a hollow shape, and a honeycomb shape, wherein the adsorbent has a standard deviation of particle length of 0.03 to 0.2.

[10] The adsorbent according to the above [9], wherein the adsorbent has a standard deviation of 0.02 to 0.1 for each of a minor axis and a major axis, and wherein the minor axis and major axis are the shortest length of the adsorbent and the longest length of the adsorbent, respectively, orthogonal to the particle length.

[11] A gas mask comprising the adsorbent according to the above [9] or [10].

[12] A solvent recovery apparatus comprising the adsorbent according to the above [9] or [10].

[13] A deodorant comprising the adsorbent according to the above [9] or [10].

[14] An automobile fuel transpiration prevention apparatus comprising the adsorbent according to the above [9] or [10].

Effect of the Invention

Since the adsorbent comprising activated carbon according to the present invention has a high adsorption performance and a high size uniformity at the same time, the ventilation resistance can be reduced, and therefore the ventilation performance can be improved when the absorbent is used for a gas mask, for example.

MODES FOR CARRYING OUT THE INVENTION

Embodiments of the present invention will now be described.

A process for producing an adsorbent comprising activated carbon according to the present invention comprises a molding step of molding an adsorbent through a plurality of stages, and the molding step comprises molding in a final stage performed by tableting.

In the present invention, the molding in the stages is not particularly limited except the molding in the final stage, but the molding is preferably performed by tableting, hydraulic extrusion molding, pellet mill molding, tumbling granulation molding, and/or molding by a granulator, and is more preferably performed by tableting, hydraulic extrusion molding, and/or pellet mill molding, from the viewpoints of improvement in packing density and hardness of the adsorbent.

The tableting can be performed by using a conventionally known tableting machine such as a high-speed rotary tableting machine "Clean Press" manufactured by Kikusui Seisakusho, Ltd., tableting machines "AP-SS," "X-SS," and "HI-FXB" manufactured by Hata Tekkosho Co., Ltd., rotary tableting machines "PICCOLA" and "MINIPRESS MII" manufactured by RIVA, rotary presses "XL400" and "PH300" manufactured by Mori Machinery Corporation, and the like. The tableting can usually be performed at a pressure of 0.2 to 10 kN and a filling depth of 5 to 30 mm. The tableting is usually performed at room temperature, but the tableting may be performed under heating and cooling.

The hydraulic extrusion molding can be achieved by using a conventionally known hydraulic extruder and, for example, can be performed by using 2FY100B140B30-AB manufactured by TAIYO, Ltd.

The pellet mill molding can be achieved by using a conventionally known pellet mill and, for example, can be performed by using 10HP Pellet Mill manufactured by Ueda Tekko Co., Ltd.

The tumbling granulation molding can be achieved by using a conventionally known tumbling granulating apparatus and, for example, can be performed by using "Marumerizer" manufactured by Dalton Corporation, "High Speed Mixer" manufactured by Fukae Powtec Corporation, and the like.

The molding by a granulator can be achieved by using a conventionally known tumbling granulation molding apparatus and, for example, can be achieved by using an OG-1 type manufactured by Kikusui Seisakusho, Ltd.

With regard to a molded body before the tableting, a molding body with high density is suitable for the tableting. A molding body with high density is suitable for the tableting because the molded body with high density has a good material packing property into a tableting die so that tableted products having a stable packing density and a uniform size can be acquired.

On the other hand, if the density of the molded body is low, the material packing property into a tableting die becomes poor, so that tableted products having a stable packing density and a uniform size cannot be acquired.

Therefore, a process for molding before tableting described above preferably comprises the tableting, the hydraulic extrusion molding, or the pellet mill molding, with which a molded body with high density can be acquired.

The activated carbon in the present invention is activated carbon having as a main raw material a non-melting solid carbonaceous material. "Non-melting" in this case means that a raw material itself does not melt or become liquid under the conditions of granulation until achieving infusibility. In other words, the carbonaceous material serving as a raw material in the present invention has a melting point or decomposition point of 300° C. or higher. The "carbonaceous material" means that the material is mainly composed of carbon and usually refers to the material composed of carbon atoms accounting for 60% or more of the total weight after drying to remove water. Additionally, "having as a main raw material" means that 50 wt % or more, preferably 70 wt % or more, of the carbon content before achieving infusibility and carbonization is derived from the solid carbonaceous material.

The non-melting solid carbonaceous material serving as a raw material of the activated carbon in the present invention is not particularly limited, and may be various materials, for example, coconut shells, oil palms, fruit seeds, sawdust, eucalyptus, wood such as pine, various plant materials, bamboo coal, various coals such as anthracite and bituminous coal, or synthetic resin such as phenol resin. The non-melting solid carbonaceous material is preferably coconut shells, coal, wood, or synthetic resin because these materials are easily obtained and can be used for producing the activated carbon with various properties. Among them, coconut shells, coal, and wood are particularly preferable because these materials are free of harmful impurities and easily commercially available, and facilitate production of the activated carbon having an appropriate pore structure.

Activated carbon can be produced by carbonizing and activating a carbonaceous material. Although conditions of the carbonization are not particularly limited, conditions such as performing treatment at a temperature of 300° C. or higher while flowing a small amount of inert gas into a batch rotary kiln can be employed in the case of a granular carbonaceous material, for example.

After the carbonizing of the carbonaceous material, the carbonized carbonaceous material can be activated to acquire the activated carbon. A method of the activation may be any method such as gas activation and drug activation. In terms of acquiring activated carbon having high mechanical strength and high adsorbing performance, gas activation method is preferable. Examples of gas used in the gas activation method include water vapor, a carbon dioxide gas, oxygen, an LPG combustion exhaust gas, and a mixed gas thereof. In view of safety and reactivity, a water vapor-containing gas having water vapor in an amount of 10 to 50 vol. % is preferable.

The activation temperature is usually 700° C. to 1100° C., and preferably 800° C. to 1000° C. The activation time and the rate of temperature increase are not particularly limited, and differ depending on a kind, a shape, a size, desired pore size distribution and the like of the selected carbonaceous material. Although the activated carbon acquired from the activation may directly be used, the activated carbon is preferably used after removing adhering components by acid washing, water washing and the like.

The activated carbon acquired in this way has a shape such as a particle shape and a sheet shape depending on the shape of the carbonaceous material and is therefore pulverized to be used. With regard to the particle diameter of the activated carbon, D50 is preferably 100 μm or less, and more preferably 50 μm or less. A pulverizing means is not particularly limited, and a known pulverizing means such as a ball mill, various crushers, and a roll mill may be used. D50 is a particle diameter when the number or mass of particles larger than a certain particle diameter accounts for 50% of that of all the particles in the particle size distribution.

The specific surface area of the activated carbon is preferably 500 $m^2/g$ or more, and more preferably about 700 to 2000 $m^2/g$. If the specific surface area of the activated carbon is smaller than the above range, an adsorption removal function of an original organic compound included in the activated carbon may not sufficiently be fulfilled.

The activated carbon to be used may be subjected to a post treatment such as a heat treatment, chemical modification of its surface, and physically supporting treatment of a functional substance on its surface, depending on an application. Examples of such a surface modification include adding and attaching a salt and an oxide of metal such as silver and iron, or a mineral acid.

The raw material of the adsorbent in the present invention may comprise a binder so as to increase the binding property of the adsorbent and to improve the formability of the molded body. The binder is not particularly limited and examples thereof may include a water-soluble polymer compound, a thermoplastic organic binding agent, a complex oxide, and the like.

Examples of the water-soluble polymer compound may include polyvinyl alcohol (hereinafter, also abbreviated as PVA), methyl cellulose (hereinafter, also abbreviated as MC), and carboxymethylcellulose (hereinafter, also abbreviated as CMC) in view of the easiness of acquisition and the absence of toxicity. Use of the water-soluble polymer compound is desirable because the molded body before heating is improved in formability.

It is preferable that the water-soluble polymer compound easily dissolves in water. Since difficulty in handling increases when the polymerization degree is very high, the viscosity of the 1% aqueous solution (20° C.) is preferably 200 mPa·second or less, and more preferably 100 mPa·second or less. Examples of such a water-soluble polymer compound include polyvinyl alcohol (PVA) "Kuraray Poval™ PVA-205" and "Kuraray Poval™ PVA-105" manufactured by Kuraray Co., Ltd., methylcellulose (MC) "Metolose™ 60SH-4000" manufactured by Shin-Etsu Chemical Co., Ltd., carboxymethylcellulose (CMC) "Cellogen™ WS-A" manufactured by DKS Co. Ltd., carboxymethylcellulose (CMC) "CMC Daicel™ 1105" and "CMC Daicel™ 1205" manufactured by Daicel Corporation, and the like.

Although the water-soluble polymer compound is usually solid and may directly be mixed with the activated carbon and the like, an aqueous solution thereof may be prepared at an appropriate concentration in advance and this aqueous solution may be mixed with the activated carbon the like.

The amount of the water-soluble polymer compound may have a significant effect on the formability. If the amount is too small, it becomes difficult to retain the form of the molded body. If the amount is too large, it becomes difficult to move a raw material mixture during molding. The appropriate amount depends on the activated carbon, a type of molding and the like, and is preferably 1 to 30 parts by mass, and more preferably 3 to 15 parts by mass, relative to 100 parts by mass of the activated carbon.

Although the thermoplastic organic binding agent is not particularly limited as long as the binding agent is a thermofusible polymer compound, the thermoplastic organic binding agent must be non-toxic if used in water treatment application, and is desirably chemically stable and has a certain degree of strength. Examples of such a polymer compound include resins including polyolefin such as polyethylene and polypropylene, a modified acrylic ester copolymer such as polymethyl methacrylate, and polyamide such as 6,6-nylon. A modified acrylic acid ester copolymer or a phenol resin is preferably used. The particle diameter of the thermoplastic organic binding agent is appropriately determined from the viewpoint of operability and the like, and is preferably 5 to 100 μm, and more preferably 10 to 30 μm.

Examples of such a thermoplastic organic binding agent include those having the trade name "NIKASOL" manufactured by Nippon Carbide Industries Co., Inc. and the trade name "Nipol" manufactured by Zeon Corporation, powder polyethylene having the trade names "Sanfine UH-900", "Sanfine UH-950", "Suntec-PAK" manufactured by Asahi Kasei Corporation, and the like.

The amount of the thermoplastic organic binding agent may be determined as needed depending on the particle diameter of the activated carbon and the like, and is preferably in a range of 10 to 150 parts by mass, and more preferably 25 to 60 parts by mass, relative to 100 parts by mass of the activated carbon.

The composite oxide is not particularly limited, and examples thereof include silica alumina, zeolite, activated clay, bentonite, clay mineral, alumina sol, and the like. The amount of the composite oxide may be within a range in which the function of the activated carbon is not impaired, and is preferably in a range of 30 to 150 parts by mass, and more preferably 40 to 110 parts by mass, relative to 100 parts by mass of the activated carbon.

Examples of such a composite oxide include those having the product names "Hotaka", "New Hotaka", "Asama", "Fuji", "Super Clay", "Yakusa Kibushi", "Akagi", "Myogi" and the like, manufactured by HOJUN Co., Ltd.

The raw material of the adsorbent in the present invention may comprise an additive. Examples of the additive include a lubricant, an excipient, and the like. Examples of the lubricant can include metal soap based lubricants such as calcium stearate, barium stearate, zinc stearate, aluminum stearate, magnesium stearate, and complexes thereof, as well as aliphatic hydrocarbon based lubricant such as liquid paraffin, polyolefin wax, and natural fat, fatty acid amide based lubricants, fatty acid ester based lubricants, fluorine plastic powder such as polytetrafluoroethylene, etc. The amount of the lubricant is preferably 1 to 5 parts by mass relative to 100 parts by mass of the activated carbon.

Examples of the excipient include known excipients such as lactose, sucrose, mannitol, sorbitol, hydroxypropyl starch, starch, and calcium hydrogen phosphate. The amount of the excipient is preferably 1 to 5 parts by mass relative to 100 parts by mass of the activated carbon.

Additionally, when the adsorption performance provided only by the activated carbon is insufficient, a further additive such as an inorganic compound having an adsorption effect particularly effective on a specific target substance may optionally be added to the raw material of the adsorbent so as to reinforce the adsorption performance of the activated carbon. Examples of such a further additive include inorganic particles of zeolite, silica alumina, titanosilicate, and the like.

In the present invention, preferably, the raw material of the adsorbent comprises water, and the molding step of the adsorbent is performed as wet molding. When the raw material of the adsorbent comprises water, appropriate fluidity can be provided to the mixed raw material and it is possible to smoothly fill it into a molding machine, so that the raw material can be filled into the molding machine without defects. As a result, the packing density and the hardness of the adsorbent can be improved. Although the amount of water differs depending on the amounts and types of the activated carbon, the binder, etc. and the type of the molding machine etc., an amount is preferably 90 to 220 parts by mass, and more preferably 120 to 180 parts by mass relative to 100 parts by mass of activated carbon, in terms of the effect of the present invention. A part or the whole of the water may be used for dissolving the water-soluble polymer compound in advance.

The shape of the molded body molded in each molding stage before the tableting in the final stage is not particularly limited and may be, for example, a spherical shape, a cubic shape, a rectangular parallelepiped shape, a cylindrical shape, a cone shape, a truncated cone shape, a polyhedral shape, a polygonal pyramid shape, a truncated pyramid shape, a donut shape, a tubular shape, a hollow shape, a honeycomb shape, and the like.

The shape and size of the molded body molded in each molding stage before the tableting in the final stage can be determined depending on the size and shape of the intended adsorbent. From the viewpoint of improvement in uniformity of the size of the adsorbent as well as improvement in packing density and hardness, those having a volume smaller than that of the molded body acquired in the final stage is preferable, and those having a volume equal to or less than about ⅓ or less of the molded body acquired in the final stage is more preferable.

A molded body obtained by molding immediately before the tableting in the final stage preferably has a crushing strength of 0.5 kgf or more, more preferably 0.7 kgf or more and still more preferably 1.0 kgf or more, and usually has a crushing strength of 1.5 kgf or less. For example, the molded body in a cylindrical shape preferably has a crushing strength of 0.5 kgf or more, more preferably 0.7 kgf or more and still more preferably 1.0 kgf or more, and usually has a crushing strength of 1.5 kgf or less and, in this case, the particle diameter [minor axis and major axis] is usually 0.1 to 20 mm while the particle length is usually 0.1 to 20 mm and, for example, the particle diameter [minor axis and major axis] is 0.8 mm while the particle length is 4.0 mm. The crushing strength of the molded body within the above range is desirable because the packing density and the hardness are increased in the adsorbent acquired by tableting and subsequent heating of the molded body.

The crushing strength can be measured by using a commercially available mechanical strength measurement apparatus capable of measuring compressive strength (e.g., Autograph AG-5000B manufactured by Shimadzu Corporation) and is a measurement value acquired by sandwiching the molded body in the minor axis direction with a compression jig and compressing the molded body under the condition of the compression rate of 10 mm/min from this state.

The shape of the molded body acquired by the tableting in the final stage is not particularly limited and may be a shape such as a spherical shape, a cubic shape, a rectangular parallelepiped shape, a cylindrical shape, a cone shape, a truncated cone shape, a polyhedral shape, a polygonal pyramid shape, a truncated pyramid shape, a donut shape, a tubular shape, a hollow shape, a honeycomb shape, and the like.

After the tableting in the final stage, the acquired molded body can be heated, sintered, fused and solidified, etc., and then cooled to acquire an adsorbent.

When the thermoplastic organic binding agent is used as the binder, the heating temperature in this case may be equal to or greater than the melting point or softening point of the thermoplastic organic binding agent; however, if the temperature is too high, the molded body may deform due to partial shrinkage and may make it difficult to acquire an absorbent having a desired shape. Also in the case of using the water-soluble polymer compound, as is the case with the thermoplastic organic binding agent, if the temperature is too high, the molded body may deform due to partial shrinkage and may make it difficult to acquire those having a desired shape. Although varying depending on a type of the binder, a suitable temperature range is preferably 115° C. to 135° C., and more preferably 115° C. to 125° C. In the case of using the complex oxide as the binder, the heating temperature may be equal to or greater than the firing temperature thereof and is preferably 800° C. or higher, and more preferably 900° C. or higher although varying depending on a type of the complex oxide. The heating is performed under an oxygen-free condition, for example, under an atmosphere of inert gas such as nitrogen and argon.

The adsorbent of the present invention has at least one shape selected from the group consisting of a spherical shape, a cubic shape, a rectangular parallelepiped shape, a cylindrical shape, a cone shape, a truncated cone shape, a polyhedral shape, a polygonal pyramid shape, a truncated pyramid shape, a donut shape, a tubular shape, a hollow shape, and a honeycomb shape.

From the viewpoint of good adsorption performance, the adsorbent according to the present invention preferably has a benzene adsorption capacity of 20 wt % or more, more preferably 25 wt % or more and still more preferably 40 wt % or more, and usually has a benzene adsorption capacity of 60 wt % or less. The benzene adsorption capacity can be measured according to JIS K1474 solvent vapor adsorption performance measurement and can be expressed by the equilibrium adsorption capacity at the concentration of 1/10 of the saturated concentration.

In the present invention, the standard deviation of the particle length of the adsorbent is preferably 0.2 or less, more preferably 0.15 or less and still more preferably 0.1 or less, and usually 0.03 or more. The standard deviation of the particle length of the adsorbent according to the present invention is preferably 0.03 to 0.2, more preferably 0.03 to 0.15, and still more preferably 0.03 to 0.1. The standard deviation of each of the minor and major axes of the adsorbent according to the present invention is preferably 0.1 or less, more preferably 0.08 or less and still more preferably 0.06 or less, and usually 0.02 or more. The standard deviation of each of the minor and major axes of the adsorbent according to the present invention is preferably 0.02 to 0.1, more preferably 0.02 to 0.08, and still more preferably 0.02 to 0.06. When the standard deviations of the minor axis, the major axis, and/or the particle length of the adsorbent are within the above ranges, the adsorbent has high size uniformly and low ventilation resistance when the adsorbent is packed. The particle length of the adsorbent is the length of the adsorbent in the depth direction of a mortar in the tableting. The minor axis and the major axis of the adsorbent are the shortest length of the adsorbent and the longest length of the adsorbent, respectively, orthogonal to the depth direction (particle length) of the mortar in the tableting. For example, in the case of the adsorbent having an elliptical cylindrical shape, the minor axis and the major axis of the adsorbent are the minor axis and the major axis, respectively, of the adsorbent orthogonal to each other on an ellipsoid orthogonal to the depth direction of the mortar in the tableting. In the case of the adsorbent having a cylindrical shape, the minor axis and the major axis of the adsorbent are the same and are the diameter (particle diameter) of the bottom surface. In the case of the adsorbent having a truncated cone shape, the minor axis and major axis of the adsorbent are a shorter diameter and a longer diameter, respectively, of the diameters of the two bottom surfaces. The minor axis, the major axis, and the particle length of the adsorbent can be measured by measuring 30 or more randomly selected adsorbent particles with a digital caliper and calculating the average value of the measured values. In the present invention, as is the case with the minor axis etc. of the adsorbent, the standard deviation is calculated for 30 or more randomly selected adsorbent particles.

For example, in the cylindrical shape having the particle diameter (minor axis and major axis) of 5 mm and the particle length of 5 mm, the adsorbent according to the present invention preferably has a ventilation resistance of 20.0 Pa/cm or less, more preferably 19.0 Pa/cm or less and still more preferably 18.5 Pa/cm or less, and usually has an ventilation resistance of 15.5 Pa/cm or more. The ventilation resistance of the adsorbent within the above range makes the ventilation performance favorable when the adsorbent is used for a gas mask, for example. The ventilation resistance of the adsorbent can be measured by filling the adsorbent in a cylindrical column of 39 mm in diameter to the layer height of 100 mm and flowing a dry air at a flow rate of 50 cm/s.

The adsorbent according to the present invention preferably has a packing density of 0.30 g/mL or more, more preferably 0.35 g/mL or more and still more preferably 0.37 g/mL or more, and usually has a packing density of 0.70 g/mL or less. The packing density of the adsorbent within the above range makes the packing properties of the adsorbent favorable. The packing density of the adsorbent can be measured according to JIS K1474 or ASTM D2854.

The adsorbent according to the present invention preferably has a JIS hardness of 80% or more, more preferably 85% or more and still more preferably 90% or more, and usually has a JIS hardness of 99.9% or less. Additionally, the adsorbent according to the present invention preferably has an MS hardness of 40% or more, more preferably 45% or more and still more preferably 50% or more, and usually has an MS hardness of 98% or less. The MS hardness and the JIS hardness of the adsorbent within the above ranges make the durability of the adsorbent favorable.

The JIS hardness can be measured by the method specified in JIS K1474. The MS hardness (micro-strength hardness) is proposed by E. Blayden et al. [H. E. Blayden, W. Noble, H. L. Riley; J. Iron. Steel Inst., Vol. 136, 47-62 (1937)] and is the hardness examined by putting samples and steel balls in two stainless steel pipes and performing a predetermined rotation at the constant number of rotations, which is a measurement method generally used in the art as the evaluation index related to coke. In the present invention, in order to increase the measurement accuracy of granulated carbon, the measurement is conducted with an amount of the sample changed from 2 g to 5 g at the number of rotations of the steel container changed from 800 to 1000 and the number of steel balls changed from 12 to 10.

In the cylindrical shape having the particle diameter (minor axis and major axis) of 5 mm and the particle length of 5 mm, the adsorbent according to the present invention preferably has a crushing strength of 0.5 kgf or more, more preferably 0.6 kgf or more and still more preferably 0.7 kgf or more, and usually has a crushing strength of 3.3 kgf or less. The crushing strength of the adsorbent within the above range makes the durability of the adsorbent favorable.

The adsorbent according to the present invention can be used for a gas phase or a liquid phase. Although the application of the absorbent according to the present invention is not particularly limited, the adsorbent is used for, for example, a gas mask, a solvent recovery apparatus, a deodorant, an automobile fuel transpiration prevention apparatus, and the like. A gas mask, a solvent recovery apparatus, a deodorant, and an automobile fuel transpiration prevention apparatus comprising the adsorbent according to the invention exhibit a high adsorption performance and have a very high ventilation performance at the same time.

EXAMPLES

The present invention will hereinafter more specifically be described with reference to Examples and Comparative Examples; however, the present invention is not limited in any way thereto.

In Examples 1 to 9 and Comparative Examples 1 to 12, the followings were used as molding machines in each molding method.
Tableting Machine
AQU3-A manufactured by Kikusui Seisakusho, Ltd. was used with a material filling depth of 13 mm, a rotary table rotating speed of 25 rpm, and a molding pressure of 3 kN.
Hydraulic Extruder
Tableting was performed by using 2FY100B140B300-AB manufactured by TAIYO, Ltd.
Pellet Mill
Pellet mill molding was performed by using the 10HP Pellet Mill manufactured by Ueda Tekko Co., Ltd.
Tumbling Granulation Molding Apparatus
Spartan Ryuza RMO-4H manufactured by Dalton Corporation was used.
Granulator
Granulation was performed by using OG-1 manufactured by Kikusui Seisakusho, Ltd., and disposing a mesh with an opening of 1 mm.

The activated carbon used in Examples 1 to 9 and Comparative Examples 1 to 12 was produced as follows.

Coal-based activated carbon (with the specific surface area of 1650 m$^2$/g), which was made from anthracite, was pulverized by a ball mill to obtain activated carbon made from coal in the present invention. The particle diameter of the pulverized material measured with a diffraction type particle size distribution meter manufactured by Shimadzu Corporation was D50=32 μm.

For activated carbon made from coconut shells, GW-H (with the specific surface area of 130 m$^2$/g) manufactured by Kuraray Chemical Co., Ltd. was pulverized with a ball mill to use the activated carbon having D50=100 μm or less.

For activated charcoal made from wood, powdered activated carbon PW (with the specific surface area of 1200 m$^2$/g and D50=35 μm) manufactured by Kuraray Chemical Co., Ltd. was used.

The components used in Examples 1 to 9 and Comparative Examples 1 to 12 of Table 1 are as follows.
Bentonite
"Hotaka™" manufactured by HOJUN Co., Ltd.
Clay Mineral
"Yakusa Kibushi" manufactured by KCM Corporation
Carboxymethylcellulose
"Cellogen™ WS-A" manufactured by DKS Co. Ltd.
Methylcellulose
"Metlose™ 60SH-4000" manufactured by Shin-Etsu Chemical Co., Ltd.

Example 1

In a Henschel mixer which is a universal mixer manufactured by Dalton, 2 kg of activated carbon, 0.22 kg of carboxymethylcellulose, 1.5 kg of bentonite, and 2.68 kg of water were introduced and uniformly stirred and mixed. This mixture was molded by the pellet mill in a first molding stage to acquire a cylindrical molded body (with the particle diameter [minor axis and major axis] of 0.8 mm and the particle length of 4 mm). The crushing strength of the acquired molded body was measured. The acquired molded body was then molded by tableting in the final stage at room temperature under molding conditions of a molding pressure of 3 kN, a material filling depth of 13 mm, a cylindrical shape, and a rotary table rotation speed of 25 rpm to finally acquire a cylindrical molded body (with the particle diameter [minor axis and major axis] of 5 mm and the particle length of 5 mm). Subsequently, the molded body was heated for one hour by using a sintering furnace at 900° C. under a nitrogen atmosphere to acquire an adsorbent.

Example 2

In accordance with the composition shown in Table 1, the components were mixed with each other in the same way as Example 1. This mixture was molded by the pellet mill in the first molding stage to acquire a cylindrical molded body (with the particle diameter [minor axis and major axis] of 0.8 mm and the particle length of 3 mm). The acquired molded body was molded by the granulator in a second molding stage to acquire a cylindrical molded body (with the particle diameter [minor axis and major axis] of 0.8 mm and the particle length of 1 mm). The crushing strength of the acquired molded body was measured. Thereafter, in the final stage of molding, the tableting was performed in the same way as Example 1 to acquire a cylindrical molded body (with the particle diameter [minor axis and major axis] of 5 mm and the particle length of 5 mm). Subsequently, the molded body was heated for one hour by using a sintering furnace at 900° C. under a nitrogen atmosphere to acquire an adsorbent.

Examples 3 to 9

In accordance with the composition shown in Table 1, the components were mixed with each other in the same way as Example 1, and a molding method shown in Table 1 was performed to acquire a cylindrical molded body (with the particle diameter [minor axis and major axis] of 5 mm and the particle length of 5 mm) in the same way as Example 1 or 2. The crushing strength of a molded body acquired by molding immediately before the tableting in the final stage was measured. Subsequently, the molded body was heated for one hour at 900° C. under a nitrogen atmosphere to acquire an adsorbent.

Comparative Example 1

In accordance with the composition shown in Table 1, the components were mixed with each other in the same way as Example 1. This mixture was molded by the hydraulic extruder to acquire a cylindrical molded body (with the particle diameter [minor axis and major axis] of 5 mm and the particle length of 5 mm). Subsequently, the molded body was heated for one hour by using a dryer at 900° C. under a nitrogen atmosphere to acquire an adsorbent.

Comparative Examples 2 to 12

In accordance with the composition shown in Table 1, the components were mixed with each other in the same way as Example 1, and a molding method shown in Table 1 was performed to acquire a cylindrical molded body (with the particle diameter [minor axis and major axis] of 5 mm and the particle length of 5 mm) in the same way as Example 1 or Comparative Example 1. The crushing strength of a molded body acquired by molding immediately before the tableting in the final stage was measured. Subsequently, the molded body was heated for one hour at 900° C. under a nitrogen atmosphere to acquire an adsorbent.

TABLE 1

| | Composition | | | | | | Molding Method | | | Crushing Strength of Molded Body |
|---|---|---|---|---|---|---|---|---|---|---|
| | Activated Carbon | | Composite Oxide | | Water-soluble Polymer Compound | | | | | Immediately Before Final Stage |
| Unit | Raw Material | parts by mass | (Bentonite) parts by mass | (Clay Mineral) parts by mass | (CMC) parts by mass | (MC) parts by mass | Water parts by mass | First Stage | Second Stage | Final Stage | kgf |
| Example 1 | coal | 100 | 75 | — | 11 | — | 134 | pellet mill | — | tableting | 0.93 |
| Example 2 | coal | 100 | 75 | — | 11 | — | 134 | pellet mill | granulator | tableting | 0.53 |
| Example 3 | coal | 100 | — | 75 | — | 11 | 134 | pellet mill | — | tableting | 0.95 |
| Example 4 | coconut shell | 100 | 75 | — | 11 | — | 145 | pellet mill | — | tableting | 0.81 |
| Example 5 | wood | 100 | 75 | — | — | 11 | 155 | pellet mill | — | tableting | 0.68 |
| Example 6 | coal | 100 | 100 | — | 11 | — | 134 | tableting | — | tableting | 2.32 |
| Example 7 | coal | 100 | — | 100 | 11 | — | 134 | pellet mill | granulator | tableting | 0.51 |
| Example 8 | coal | 100 | — | 50 | 11 | — | 134 | pellet mill | — | tableting | 0.89 |
| Example 9 | coconut shell | 100 | 50 | — | 11 | — | 145 | hydraulic extrusion | — | tableting | 0.84 |
| Comparative Example 1 | coal | 100 | — | 75 | — | 11 | 140 | — | — | hydraulic extrusion | — |
| Comparative Example 2 | coconut shell | 100 | — | 75 | — | 11 | 150 | — | — | hydraulic extrusion | — |
| Comparative Example 3 | coal | 100 | 75 | — | 11 | — | 134 | — | — | pellet mill | — |
| Comparative Example 4 | coconut shell | 100 | 75 | — | 11 | — | 145 | — | — | pellet mill | — |
| Comparative Example 5 | coal | 100 | 75 | — | 11 | — | 140 | — | — | hydraulic extrusion | — |

TABLE 1-continued

| | Composition | | | | | | | Molding Method | | | Crushing Strength of Molded Body |
|---|---|---|---|---|---|---|---|---|---|---|---|
| | Activated Carbon | | Composite Oxide | | Water-soluble Polymer Compound | | Water | | | | Immediately Before Final |
| | | parts | (Bentonite) | (Clay Mineral) | (CMC) parts | (MC) parts | parts | First | Second | Final | Stage |
| Unit | Raw Material | by mass | parts by mass | parts by mass | by mass | by mass | by mass | Stage | Stage | Stage | kgf |
| Comparative Example 6 | wood | 100 | 75 | — | 11 | — | 155 | tableting | — | granulator | 2.21 |
| Comparative Example 7 | coal | 100 | 75 | — | 11 | — | 134 | hydraulic extrusion | — | granulator | 0.79 |
| Comparative Example 8 | coconut shell | 100 | 75 | — | 11 | — | 145 | pellet mill | — | granulator | 0.97 |
| Comparative Example 9 | coal | 100 | 75 | — | — | 11 | 134 | tableting | — | hydraulic extrusion | 2.21 |
| Comparative Example 10 | coconut shell | 100 | — | 75 | — | 11 | 145 | tableting | — | pellet mill | 2.18 |
| Comparative Example 11 | coal | 100 | — | 75 | — | 11 | 134 | hydraulic extrusion | — | pellet mill | 0.76 |
| Comparative Example 12 | coal | 100 | 75 | — | 11 | — | 134 | — | — | tableting | — |

For the adsorbents acquired in Examples 1 to 9 and Comparative Examples 1 to 12, the packing density, the JIS hardness, the MS hardness, the crushing strength, the benzene adsorption capacity, the ventilation resistance, the particle diameter [minor axis and major axis], and the particle length were measured. The results are shown in Table 2.

The packing density, the JIS hardness, and the benzene adsorption ability were measured according to JIS K1474. The MS hardness, the crushing strength, the ventilation resistance, the particle diameter, and the particle length were measured with the methods described above.

TABLE 2

| | Benzene Adsorption | Particle Diameter [Minor Axis and Major Axis] | | Particle Length | | Ventilation | Packing | JIS | MS | Crushing |
|---|---|---|---|---|---|---|---|---|---|---|
| Unit | Ability mass % | mm (average) | standard deviation | mm (average) | standard deviation | Resistance Pa/cm | Density g/mL | Hardness % | Hardness % | Strength kgf |
| Example 1 | 33.2 | 4.85 | 0.037 | 4.59 | 0.066 | 16 | 0.525 | 99.9 | 85.6 | 2.13 |
| Example 2 | 33.0 | 4.92 | 0.041 | 4.87 | 0.078 | 18 | 0.568 | 99.9 | 88.7 | 2.57 |
| Example 3 | 33.1 | 4.84 | 0.034 | 4.61 | 0.061 | 16 | 0.555 | 99.9 | 86.2 | 2.22 |
| Example 4 | 25.6 | 4.82 | 0.042 | 4.73 | 0.074 | 18 | 0.479 | 99.7 | 80.4 | 2.13 |
| Example 5 | 28.2 | 4.88 | 0.035 | 4.77 | 0.058 | 18 | 0.422 | 98.4 | 62.4 | 2.20 |
| Example 6 | 27.8 | 4.84 | 0.036 | 4.55 | 0.060 | 17 | 0.612 | 99.9 | 92.5 | 2.98 |
| Example 7 | 28.2 | 4.90 | 0.045 | 4.88 | 0.077 | 18 | 0.603 | 99.9 | 93.1 | 2.96 |
| Example 8 | 38.8 | 4.88 | 0.037 | 4.64 | 0.063 | 16 | 0.498 | 97.1 | 74.6 | 1.98 |
| Example 9 | 25.8 | 4.81 | 0.038 | 4.71 | 0.071 | 18 | 0.385 | 94.3 | 70.1 | 1.83 |
| Comparative Example 1 | 33.2 | 4.83 | 0.105 | 12.23 | 3.075 | 28 | 0.444 | 96.1 | 60.3 | 0.83 |
| Comparative Example 2 | 25.7 | 4.80 | 0.245 | 13.58 | 4.374 | 28 | 0.421 | 95.7 | 59.6 | 0.76 |
| Comparative Example 3 | 33.2 | 4.79 | 0.315 | 10.46 | 2.295 | 25 | 0.457 | 97.2 | 61.5 | 0.94 |
| Comparative Example 4 | 25.5 | 4.77 | 0.172 | 11.85 | 4.237 | 25 | 0.439 | 96.2 | 62.2 | 0.83 |
| Comparative Example 5 | 33.3 | 4.85 | 0.269 | 13.78 | 4.418 | 22 | 0.422 | 96.6 | 60.0 | 0.85 |
| Comparative Example 6 | 25.9 | 4.83 | 0.039 | 3.56 | 1.089 | 24 | 0.406 | 98.2 | 60.5 | 2.04 |
| Comparative Example 7 | 33.3 | 4.89 | 0.095 | 8.92 | 2.011 | 27 | 0.442 | 96.4 | 60.3 | 0.80 |

TABLE 2-continued

| Unit | Benzene Adsorption Ability mass % | Particle Diameter [Minor Axis and Major Axis] | | Particle Length | | Ventilation Resistance Pa/cm | Packing Density g/mL | JIS Hardness % | MS Hardness % | Crushing Strength kgf |
|---|---|---|---|---|---|---|---|---|---|---|
| | | mm (average) | standard deviation | mm (average) | standard deviation | | | | | |
| Comparative Example 8 | 25.4 | 4.75 | 0.152 | 10.23 | 2.227 | 25 | 0.451 | 97.5 | 63.8 | 0.81 |
| Comparative Example 9 | 33.3 | 4.80 | 0.237 | 12.47 | 4.896 | 25 | 0.475 | 99.4 | 64.3 | 1.67 |
| Comparative Example 10 | 25.2 | 4.83 | 0.255 | 13.31 | 4.012 | 28 | 0.455 | 99.1 | 57.4 | 1.41 |
| Comparative Example 11 | 33.5 | 4.85 | 0.184 | 11.69 | 4.794 | 28 | 0.455 | 99.3 | 66.1 | 1.56 |
| Comparative Example 12 | 33.0 | 4.86 | 0.044 | 4.51 | 1.683 | 22 | 0.605 | 99.1 | 90.4 | 2.87 |

It can be understood from the above results that the adsorbents according to the present invention acquired in Examples 1 to 9 have a high adsorption performance and at the same time have a high size uniformity, in view that the standard deviations of the particle diameter and the particle length are very low values. Additionally, when the crushing strength of the molded body acquired by molding immediately before the tableting in the final stage was high, the adsorbents having high packing density and hardness as well as crushing strength were obtained.

On the other hand, in the absorbents in Comparative Examples 1 to 12, as compared to the adsorbents according to the present invention, the standard deviations of the particle diameter and the particle length of the adsorbents are low so that the size is non-uniform, and the object of the present invention was not able to be achieved.

The invention claimed is:

1. A process for producing an adsorbent consisting of activated carbon and optionally one or both of a binder and a lubricant selected from the group consisting of metal soap based lubricant, aliphatic hydrocarbon based lubricant, fatty acid amide based lubricant, fatty acid ester based lubricant and fluorine plastic powder, the process comprising molding an adsorbent through a plurality of stages, that comprises subjecting the activated carbon to at least one of tableting, hydraulic extrusion molding, pellet mill molding, tumbling granulation molding, and molding by a granulator to yield a molded body that has a crushing strength of at least 0.5 kgf immediately prior to a final tableting step, the final tableting step comprises subjecting the molded body to compression molding.

2. The process for producing according to claim 1, wherein the molding is performed as wet molding.

3. The process for producing according to claim 1, wherein:
the adsorbent has a standard deviation of particle length of 0.03 to 0.2.

4. The process for producing according to claim 1, wherein:
the adsorbent has a standard deviation of particle length of 0.02 to 0.1 for each of a minor axis and a major axis.

5. The process for producing according to claim 1, wherein the activated carbon is obtained by activating carbon with gas activation.

6. The process for producing according to claim 1, wherein the activated carbon is produced from one or more raw materials selected from the group consisting of coconut shells, coal, wood, and synthetic resin.

7. The process for producing according to claim 6, wherein the raw material comprises carbonaceous material having a melting point of at least 300° C.

8. The process for producing according to claim 7, wherein the raw material comprises at least 60% of carbon based on the total weight of dried raw material.

9. The process for producing according to claim 1, wherein the activated carbon has a particle diameter, D50, of 100 μm or less.

10. The process for producing according to claim 1, wherein the activated carbon has a specific surface area of 500 m$^2$/g or more.

11. The process for producing according to claim 1, wherein the adsorbent comprises, as a raw material thereof, one or more binders selected from the group consisting of a carboxymethylcellulose, a methyl cellulose, a polyvinyl alcohol, a clay mineral, a bentonite, a modified acrylic acid ester copolymer, and a phenolic resin.

12. The process for producing according to claim 1, wherein the adsorbent is suitable as an adsorbent for a gas mask, a solvent recovery apparatus, a deodorant, or an automobile fuel transpiration prevention apparatus.

* * * * *